(12) United States Patent
Sweeney et al.

(10) Patent No.: US 11,118,784 B2
(45) Date of Patent: Sep. 14, 2021

(54) HEAT EXCHANGER INTEGRATED WITH FUEL NOZZLE

(71) Applicant: Rolls-Royce North American Technologies, Inc., Indianapolis, IN (US)

(72) Inventors: Patrick C. Sweeney, Indianapolis, IN (US); Douglas J. Snyder, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 754 days.

(21) Appl. No.: 15/592,777

(22) Filed: May 11, 2017

(65) Prior Publication Data

US 2018/0266691 A1    Sep. 20, 2018

Related U.S. Application Data

(63) Continuation-in-part of application No. 15/411,239, filed on Jan. 20, 2017.

(60) Provisional application No. 62/288,114, filed on Jan. 28, 2016.

(51) Int. Cl.
| | |
|---|---|
| *F23R 3/28* | (2006.01) |
| *F02C 7/232* | (2006.01) |
| *F02C 3/06* | (2006.01) |
| *F02C 7/22* | (2006.01) |

(52) U.S. Cl.
CPC ............. *F23R 3/283* (2013.01); *F02C 3/06* (2013.01); *F02C 7/222* (2013.01); *F02C 7/232* (2013.01); *F05D 2220/32* (2013.01); *F05D 2240/35* (2013.01); *F05D 2260/20* (2013.01); *F05D 2260/232* (2013.01); *Y02T 50/60* (2013.01)

(58) Field of Classification Search
CPC ........... F23R 3/283; F23R 2900/06043; F02C 7/224; F05D 2240/35; F05D 2260/20; F05D 2260/204
See application file for complete search history.

(56) References Cited

U.S. PATENT DOCUMENTS

| | | | |
|---|---|---|---|
| 3,535,875 A | 10/1970 | Litke et al. | |
| 4,120,150 A * | 10/1978 | Wakeman | F02C 7/185 60/39.091 |
| 4,229,944 A | 10/1980 | Weiler | |
| 5,351,477 A | 10/1994 | Joshi et al. | |

(Continued)

FOREIGN PATENT DOCUMENTS

| | | |
|---|---|---|
| CN | 104110309 A | 10/2014 |
| EP | 2664766 A2 | 11/2013 |

(Continued)

OTHER PUBLICATIONS

Extended European Search Report, dated Sep. 18, 2018 and issued in connection with EP Appln. No. 18169171.8.

(Continued)

*Primary Examiner* — Todd E Manahan
*Assistant Examiner* — Thuyhang N Nguyen
(74) *Attorney, Agent, or Firm* — Barnes & Thornburg LLP

(57) ABSTRACT

Fuel-air heat exchange system and methods thereof for use in a gas turbine engine. The fuel-air heat exchanger allows heat transfer between a flow of cooling air used to cool components of the engine and a flow of fuel used to drive the engine.

21 Claims, 3 Drawing Sheets

(56) References Cited

U.S. PATENT DOCUMENTS

| | | | |
|---|---|---|---|
| 5,735,115 A | 4/1998 | Maghon | |
| 5,915,626 A | 6/1999 | Awarzamani et al. | |
| 6,149,075 A | 11/2000 | Moertle et al. | |
| 6,481,641 B1 | 11/2002 | Mieney | |
| 6,584,778 B1 | 7/2003 | Griffiths et al. | |
| 6,763,663 B2 | 7/2004 | Mansour et al. | |
| 6,993,913 B2* | 2/2006 | Kobayashi | F02C 7/12 60/736 |
| 7,827,795 B2* | 11/2010 | Hicks | F02C 3/30 60/39.83 |
| 8,342,425 B2 | 1/2013 | Imoehl | |
| 8,479,518 B1 | 7/2013 | Chen | |
| 8,820,047 B2 | 9/2014 | Saito et al. | |
| 9,074,566 B2 | 7/2015 | Czimmek et al. | |
| 9,932,940 B2* | 4/2018 | Lo | F02C 7/224 |
| 2004/0040306 A1 | 3/2004 | Prociw et al. | |
| 2007/0101731 A1 | 5/2007 | Bayt et al. | |
| 2010/0071667 A1 | 3/2010 | Hicks et al. | |
| 2011/0005232 A1 | 1/2011 | Williams et al. | |
| 2011/0016866 A1 | 1/2011 | Boardman et al. | |
| 2011/0088405 A1 | 4/2011 | Turco | |
| 2011/0107769 A1 | 5/2011 | Stevenson et al. | |
| 2011/0302928 A1 | 12/2011 | Mudawar | |
| 2013/0199199 A1 | 8/2013 | Moddemann | |
| 2013/0219915 A1 | 8/2013 | Prociw et al. | |
| 2014/0060057 A1 | 3/2014 | John et al. | |
| 2014/0238036 A1 | 8/2014 | Uhm et al. | |
| 2014/0327194 A1 | 11/2014 | Matusewicz et al. | |
| 2014/0338334 A1 | 11/2014 | Karam et al. | |
| 2015/0000291 A1 | 1/2015 | Smith et al. | |
| 2016/0025009 A1 | 1/2016 | Morenko et al. | |
| 2016/0138873 A1 | 5/2016 | Dyer | |
| 2016/0161189 A1 | 6/2016 | Borghese et al. | |
| 2016/0273453 A1 | 9/2016 | Frish et al. | |
| 2016/0290290 A1 | 10/2016 | Lo | |

FOREIGN PATENT DOCUMENTS

| | | |
|---|---|---|
| EP | 2677240 A2 | 12/2013 |
| EP | 3075983 A1 | 10/2016 |
| EP | 3199871 A1 | 8/2017 |
| FR | 2817016 A1 | 5/2002 |
| GB | 2476253 A | 6/2011 |
| WO | 2015054136 A1 | 4/2015 |
| WO | 2015112215 A2 | 7/2015 |

OTHER PUBLICATIONS

Extended European Search Report, dated Oct. 24, 2018 and issued in connection with EP Appln. No. 18170080.8.

Extended European Search Report, European Application No. 17152879.7-1605, dated Jul. 3, 2017, 9 pages.

* cited by examiner

HEAT EXCHANGER INTEGRATED WITH FUEL NOZZLE

CROSS REFERENCE TO RELATED APPLICATIONS

This application is a continuation-in-part of, and claims the benefit of and priority to, U.S. Non-Provisional patent application Ser. No. 15/411,239, filed Jan. 20, 2017, which claims priority to and the benefit of U.S. Provisional Patent Application No. 62/288,114, filed Jan. 28, 2016, the disclosures of each of which are now expressly incorporated herein by reference, including but not limited to those portions related to turbine heat exchanger design and operation.

GOVERNMENT RIGHTS

The present application was made with the United States government support under NASA Contract No. NNX16CC83P 16NAS001-1, awarded by the United States government. The United States government may have certain rights in the present application.

BACKGROUND

The present disclosure relates generally to gas turbine engines, and more specifically to cooling air systems of a gas turbine engine.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft.

Components in the turbine may be exposed to high temperatures from products of the combustion reaction in the combustor. Cooling of these components can present design challenges. Efficient coordination and/or use of heat can improve performance.

SUMMARY

The present application discloses one or more of the features recited in the appended claims and/or the following features which, alone or in any combination, may comprise patentable subject matter.

According to an aspect of the present disclosure, a gas turbine engine may include a power train including a compressor, combustor, and a turbine, the compressor arranged to compress air, the combustor including a combustion chamber arranged to receive compressed air and fuel for combustion to form exhaust products, the turbine including a rotor and blade extending from the rotor to receive exhaust products expanding across the blades to drive rotation of the rotor, an outer casing defining a high pressure cavity adapted to receive compressed air from the compressor, the combustion chamber arranged at least partly within the high pressure cavity, and a fuel injector. The fuel injector may include a nozzle configured to discharge fuel into the combustion chamber, a stem secured to and penetrating through the outer casing, the stem fluidly coupled with the nozzle and configured to conduct fuel to the nozzle, and a microchannel fuel-air heat exchanger integral with the stem and including a body having a fuel passageway fluidly coupled with the nozzle to pass fuel and a cooling air passageway arranged in thermal communication with the fuel passageway to transmit heat to fuel within the fuel passageway. The microchannel heat exchanger may be arranged outside of the high pressure cavity and secured with the outer casing.

In some embodiments, the outer casing may include a port defined therethrough. The stem may be arranged to extend through the port. In some embodiments, the outer casing may include a transfer passage arranged in fluid communication with each of the high pressure cavity and the cooling air passage to direct compressed air from the high pressure cavity into the cooling air passage. In some embodiments, the transfer passage may extend through the port.

In some embodiments, the microchannel fuel-air heat exchanger may include a hood defining an exchanger cavity, the hood secured with the outer casing. In some embodiments, the stem may extend through the hood into the high pressure cavity. In some embodiments, the stem may include a fuel supply port arranged in fluid communication with the fuel passageway to provide fuel from outside the high pressure cavity and a fuel receiving port arranged in fluid communication with the fuel passageway to receive fuel for conducting fuel to the nozzle.

In some embodiments, the body of the microchannel heat exchanger may be arranged within the exchanger cavity. The stem may extend through the body.

In some embodiments, the fuel injector may include a check valve arranged within the stem to maintain pressure with the fuel passageway. In some embodiments, the check valve may be arranged within the stem at the outer casing. In some embodiments, the check valve may be arranged within the stem at the outer casing within the high pressure cavity.

According to another aspect of the present disclosure, a fuel injector for a gas turbine engine may include a nozzle configured to discharge fuel into a combustion chamber of the gas turbine engine, a stem fluidly coupled with the nozzle and configured to conduct fuel to the nozzle, and a microchannel fuel-air heat exchanger integral with the stem and including a body having a fuel passageway fluidly coupled with the nozzle to pass fuel and a cooling air passageway arranged in thermal communication with the fuel passageway to transmit heat to fuel within the fuel passageway. The microchannel heat exchanger may include a mounting platform secured with the stem for mounting the stem within the gas turbine engine.

In some embodiments, the outer casing may include a port defined therethrough and the stem may be arranged to extend through the port. In some embodiments, the microchannel fuel-air heat exchanger may include a transfer passage extending through the mounting platform and arranged in fluid communication with the cooling air passage to direct compressed air into the cooling air passage.

In some embodiments, the microchannel fuel-air heat exchanger may include a hood defining an exchanger cavity. In some embodiments, the stem may extend through the hood.

In some embodiments, the stem may include a fuel supply port arranged in fluid communication with the fuel passageway to provide fuel into the body and a fuel receiving port arranged in fluid communication with the fuel passageway to receive fuel for conducting fuel to the nozzle.

In some embodiments, the body of the microchannel heat exchanger may be arranged within the exchanger cavity. The stem may extend through the body.

In some embodiments, the fuel injector may include a check valve arranged within the stem to maintain pressure with the fuel passageway. In some embodiments, the check valve may be arranged at the mounting platform within the stem downstream from the body.

These and other features of the present disclosure will become more apparent from the following description of the illustrative embodiments.

DETAILED DESCRIPTION

Figure 1:
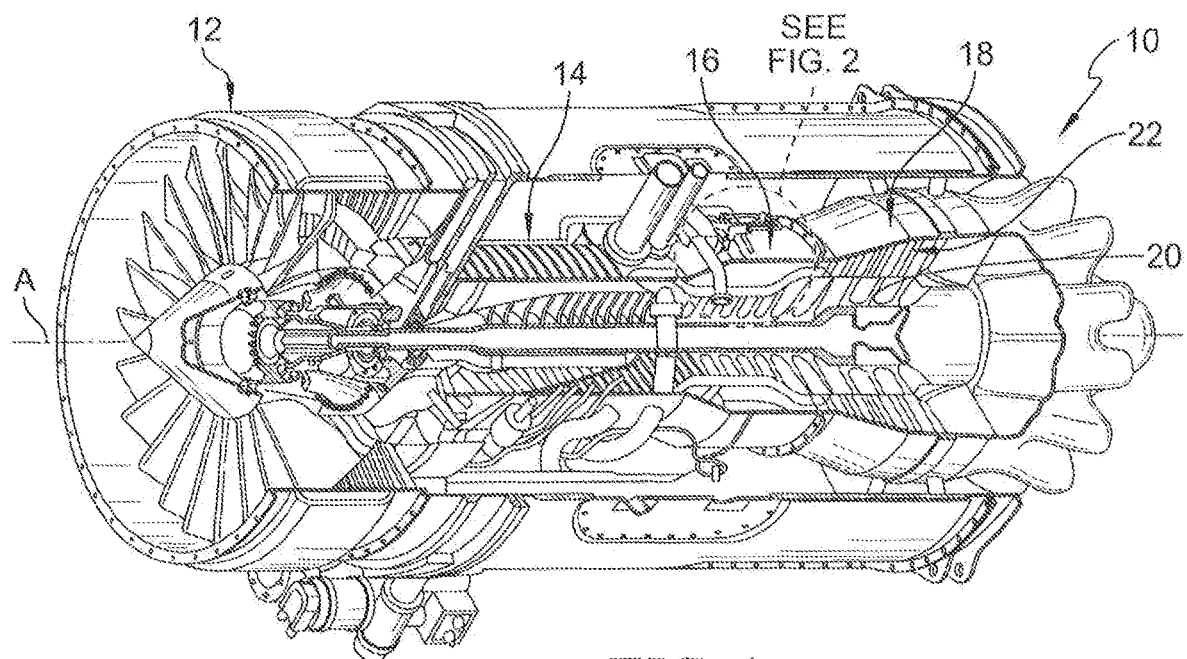
FIG. 1 is a cut-away perspective view of a gas turbine engine showing that the engine includes a fan, a compressor, a combustor, and a turbine.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18 as shown in FIG. 1. The fan 12 and the compressor 14 are illustratively driven by the turbine 18 to provide air for engine use. The compressor 14 compresses and delivers air to the combustor 16. The combustor 16 mixes fuel with the compressed air received from the compressor 14 and ignites the fuel. From the combustor 16, the hot, high-pressure exhaust products of the combustion reaction are directed into the turbine 18. The turbine 18 illustratively includes a rotor 20 and blades 22 extending radially from the rotor 20 to receive expansion of the exhaust products causing the rotor 20 to rotate about a central axis A and to drive the compressor 14 and the fan 12. As used herein, directional references generally relate to the central axis A of the engine 10. In some embodiments, any suitable configuration of turbomachinery components including a combustor and turbine may be applied.

Preheating fuel before delivery to the combustor 16 can provide performance and/or efficiency gains. One source of waste energy which can provide heat to the fuel is compressor discharge and/or bleed air. The cooled source of waste heat, for example, compressed air that has provided heat to the fuel, can be used as cooling air for other areas of the gas turbine engine, for example, within the turbine 18. Performing such air-to-fuel heat exchange near the location of fuel input for combustion can avoid and/or reduce risks, such as, inadvertent combustion.

Figure 2:
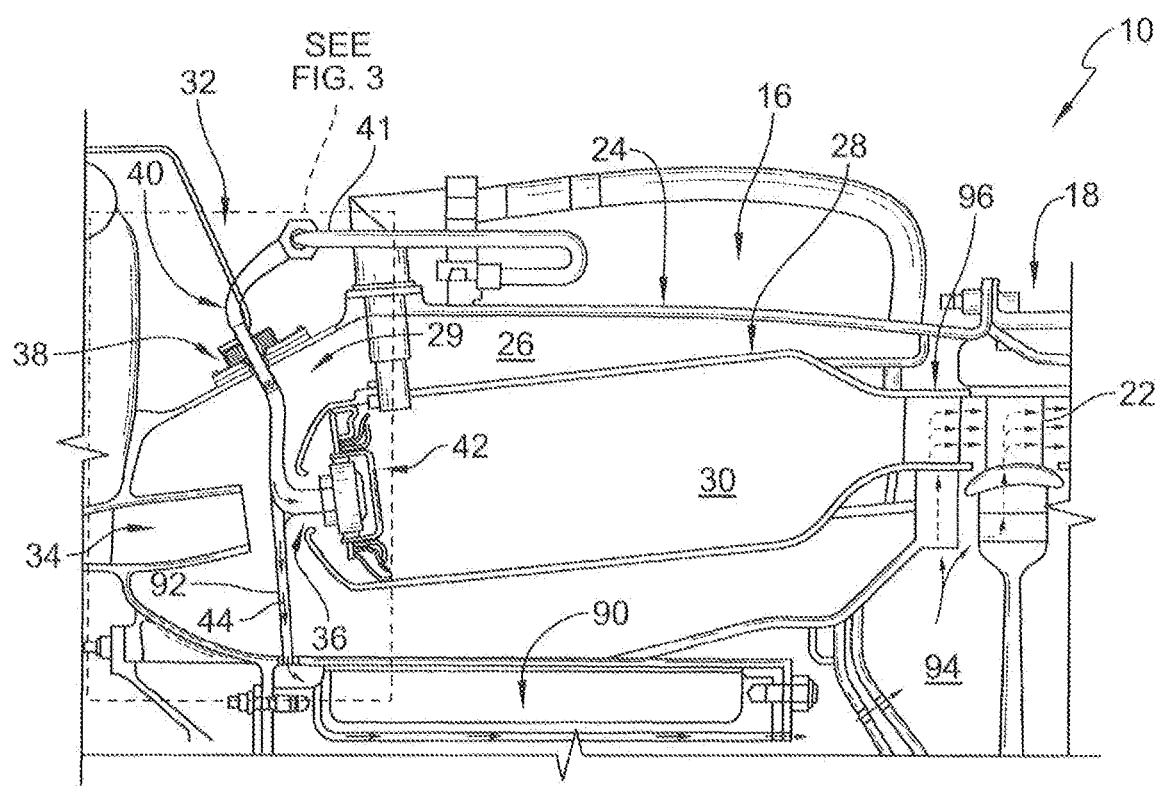
FIG. 2 is a partial sectional view of the gas turbine engine of FIG. 1 showing that a fuel injector is coupled to an outer combustor case aft of the compressor and forward of the combustor and suggesting that air from the compressor is directed through a heat exchanger integrated into the fuel injector to transfer heat to fuel products also flowing through the heat exchanger before injection into a combustion cavity.

As shown in FIG. 2, the combustor 16 illustratively includes an outer casing 24 defining a cavity 26 therein. The cavity 26 of the outer casing 24 illustratively provides a high-pressure plenum for high-pressure products flowing within the combustor 16. The cavity 26 includes a compressed air inlet 34 for receiving compressed air from the compressor 14. The combustor 16 illustratively includes a combustion liner 28 defining a combustion chamber 30 for combustion of the fuel and air mixture. A plurality of circumferentially spaced fuel injectors 32 are illustratively arranged about the combustion chamber 30 to provide fuel for combustion.

As shown in FIG. 2, the fuel injectors 32 illustratively extend radially from outside the outer casing 24 to an inlet 36 of the combustion liner 28. The fuel injectors 32 illustratively penetrate through the outer casing 24 to enter to the cavity 26. Each fuel injector 32 illustratively includes a heat exchanger 38 for transferring heat to the fuel before injection into the combustion chamber 30.

Heating combustible fuel can present challenges including the potential for ignition. In adapted use of gas turbine engines for aerospace applications, fuel in the area of the fuel injectors can reach near-critical conditions. Maintaining safe and effective fuel heating can be of particular concern. By performing heat transfer to the fuel at a location closely in proximity to the combustion chamber 30, the instantaneous volume of heated fuel can be reduced. For example, by reducing the distance between the point of heat exchange and the injection point (here the inlet 36 of the combustion chamber 30), the transport volume of heated fuel can be reduced and thus the risk and/or the impact of inadvertent combustion of fuel can be curtailed.

As shown in FIG. 2, each fuel injector 32 illustratively includes a stem 40 fluidly coupled to receive pressurized fuel from a fuel system (indicated as 41) and a nozzle 42 fluidly coupled with the stem 40 and arranged near the combustion liner 28 to distribute fuel into the combustion chamber 30. The heat exchanger 38 is illustratively formed integral with the stem 40 to heat fuel that flows through the stem 40 towards the nozzle 42. The integrated arrangements of the present disclosure combine the heat exchanger 38 with the stem 40 and can conserve space and design while reducing residual hot fuel.

Figure 3:
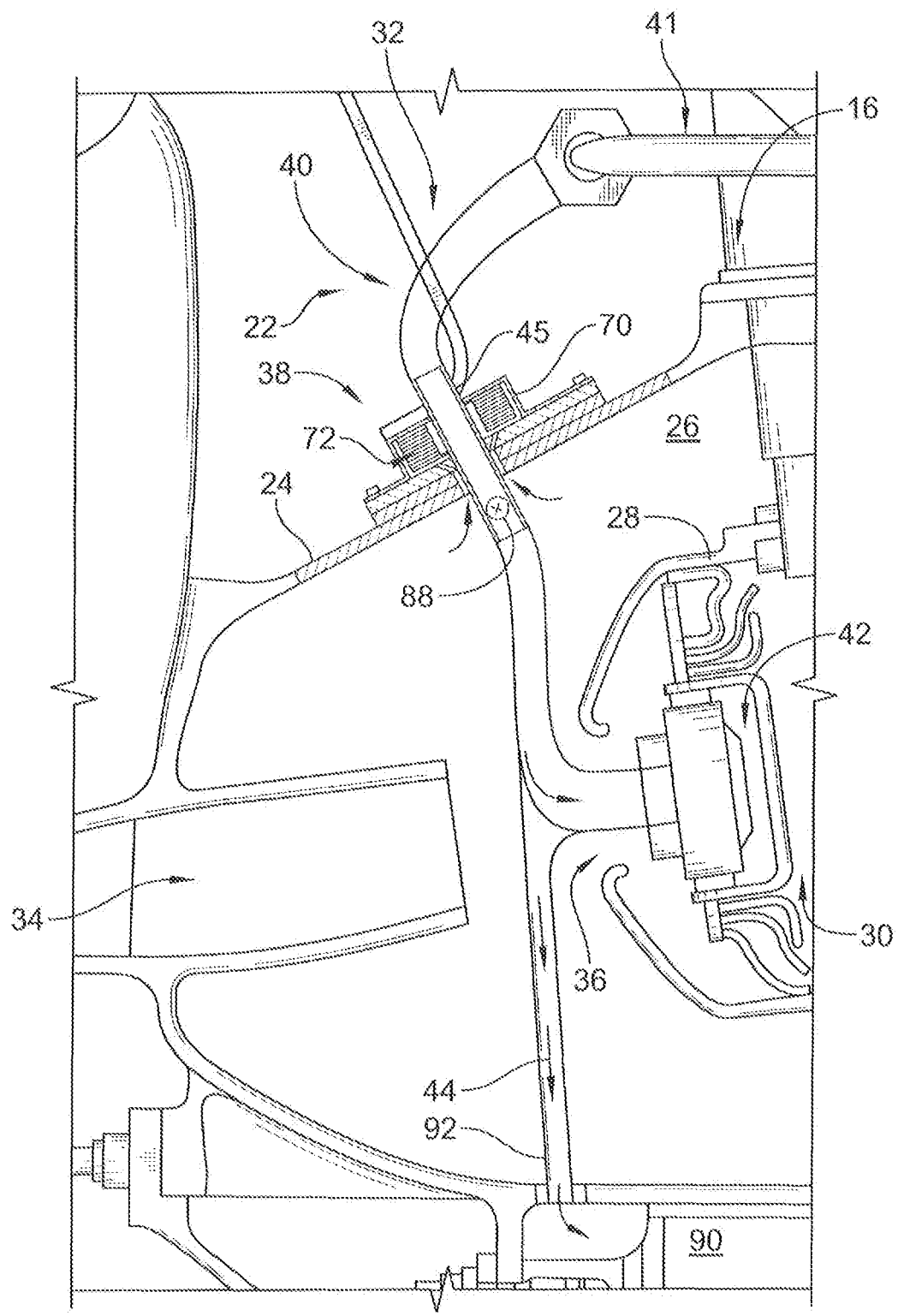
FIG. 3 is an enlarged view of FIG. 2 showing that the heat exchanger is integral with a stem of the injector which extends into a high pressure cavity of the combustor to a nozzle arranged at an inlet to a combustion chamber (right), and showing that the heat exchanger is secured to the outer casing as an integral part of the stem.

Referring now to FIG. 3, the heat exchanger 38 is illustratively secured to the outer casing 24 and positioned outside of the cavity 26. Arranging the heat exchanger 38 outside of the cavity 26 can provide less obstruction within the high-pressure areas of the combustor 16, including cavity 26. The stem 40 extends through the outer casing 24 to deliver fuel to the nozzle 42 and illustratively provides cooled cooling air (represented by arrows 44) to an inner portion 90 of the gas turbine engine 10.

Figure 4:
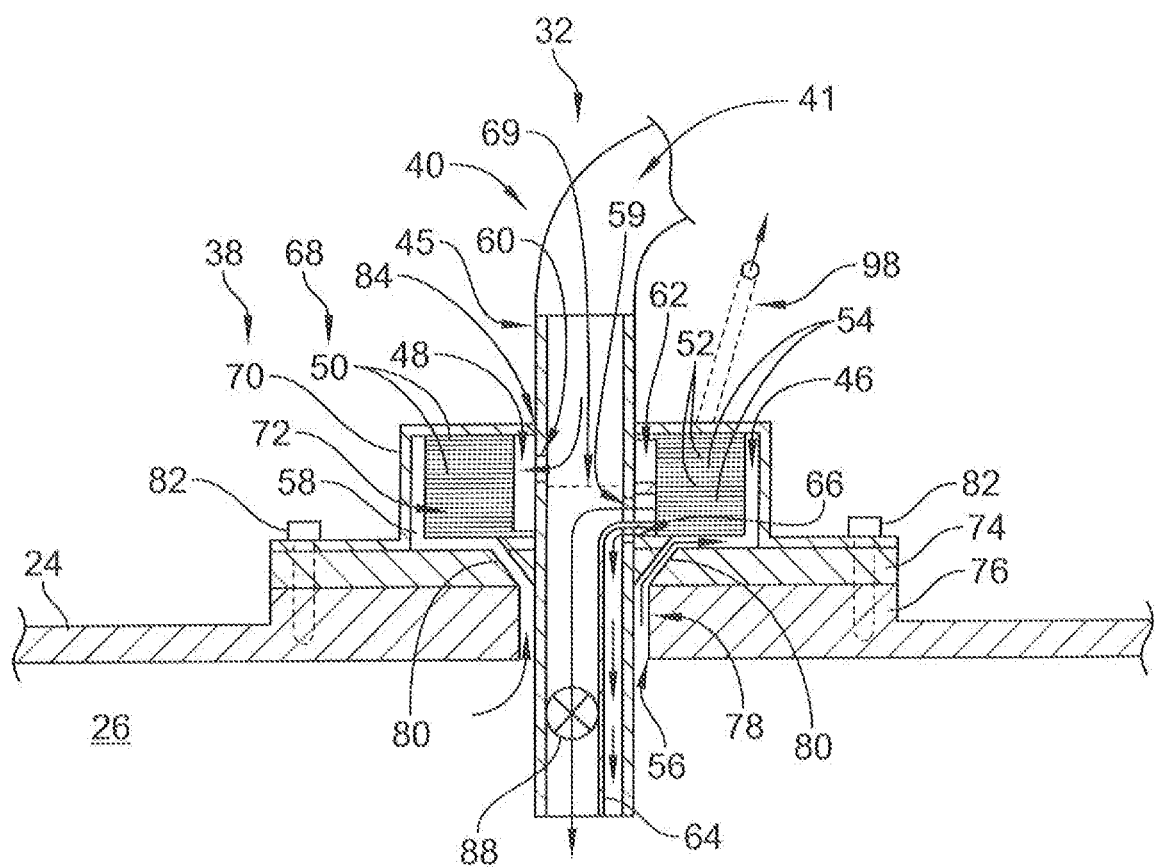
FIG. 4 is an enlarged view of a portion of the fuel injector of FIG. 3 showing that the heat exchanger includes a hood housing a body having microchannels for passing fuel and air in heat exchange to heat the fuel, a conduit section of the stem penetrates through the heat exchanger body and the outer casing to provide fuel to the nozzle, and showing that that a fuel check valve is arranged downstream from the heat exchanger body within the high pressure cavity.

As shown in FIG. 4, the stem 40 of each fuel injector 32 includes a conduit section 45 that penetrates through the outer casing 24. The heat exchanger 38 is illustratively formed as a microchannel heat exchanger including a cooling air passageway 46 and a fuel passageway 48. The heat exchanger 38 illustratively includes a number of sheets 50 stacked together and defining a number of microchannels 52, 54 in thermal communication with each other. The microchannels 52, 54 illustratively include cooling air microchannels 52 which conduct cooling air therethrough and fuel microchannels 54 that conduct fuel therethrough. In the illustrative embodiment, the microchannels 52, 54 are embodied as arranged alternating between the sheets 50 and each being in thermal communication with at least the adjacent microchannels 52, 54.

In the illustrative embodiment as shown in FIG. 4, the cooling air passageway 46 receives (hot) cooling air for providing heat to the fuel. The cooling air passageway 46 illustratively includes an inlet 56 formed as a gap defined at the penetration of the conduit section 45 through the outer casing 24. The inlet 56 illustratively communicates with a manifold 58 for distribution of (hot) cooling air from the cavity 26 to the microchannels 52 to provide heat to the fuel. The cooling air passageway 46 illustratively includes an outlet 66 formed as a hole penetrating through the conduit section 45 of the stem 40 to permit (cooled) cooling air to enter the conduit section 45. In the illustrative embodiment, a (cooled) cooling air conduit 64 is arranged within the stem 40 for transporting (cooled) cooling air within the stem 40, while separated from fuel.

As shown in FIG. 4, the fuel passageway 48 illustratively receives fuel through the stem 40 into the conduit section 45 from the fuel system 41. The fuel passageway 48 illustratively includes an inlet 60 for receiving fuel from the conduit section 45 into a fuel manifold 62 for distribution to the microchannels 54 to receive heat from the cooling air. The fuel passageway 48 illustratively includes an outlet 59 for providing heated fuel from the microchannels 54 into the conduit section 45. The conduit section 45 illustratively includes a divider 69 that fluidly separates the inlet 60 from the outlet 59 within the conduit 45, but in some embodiments, the divider 69 may permit some fuel therethrough or may be excluded, such that less than all of the fuel through the stem 40 passes through the microchannels 54.

In the illustrative embodiment, the heat exchanger 38 is formed as a printed circuit heat exchanger. The microchannels 52, 54 are illustratively formed as etchings impressed onto the sheets 50. The sheets 50 collectively define a heat exchanger body 68. The sheets 50 are illustratively stacked and diffusion bonded to form the body 68 having the microchannels 52, 54 as part of the cooling air and fuel passageways 46, 48, respectively. The microchannel construction of the heat exchanger 38 provides compact design and reduces layout space near the combustor 16. In some embodiments, the microchannels 52, 54 and/or the body 68 may be formed by any suitable process.

As shown in FIG. 4, the heat exchanger 38 is formed as a structural portion of the stem 40. The heat exchanger 38 illustratively includes the body 68 and a hood 70 that is secured with the outer casing 24 and defines a pressure cavity 72 therein for housing the body 68. The fuel injector 32 illustratively includes a flange 74 extending from the conduit section 45. The flange 74 is illustratively formed integral with the conduit section 45 for structurally supporting connection between the stem 40 and the outer casing 24.

The outer casing 24 illustratively includes a pad 76 embodied as a thickened area formed integrally with the outer casing 24 for receiving the flange 74. The outer casing 24, including the pad 76, defines a port 78 as the penetration through which the conduit section 45 extends and in which the inlet 56 of the cooling air passageway 46 is defined. The flange 74 illustratively includes holes 80 extending therethrough in communication with the inlet 56 and the cooling air manifold 58 to provide cooling air from the cavity 26.

In the illustrative embodiment as shown in FIG. 4, the flange 74 is mounted onto the pad 76 and the hood 70 is mounted onto the flange 74. The hood 70 illustratively forms a fluid seal with the flange 74 to seal the cavity 72. Fasteners 82 illustratively penetrate through each of the hood 70 and the flange 74 and have threaded engagement within fastener holes of the pad 76 to secure the fuel injector 32 with the outer casing 24. The hood 70 illustratively includes an opening 84 penetrating therethrough and receiving the conduit section 45. The opening 84 is fluidly sealed with the conduit section 45 to seal the cavity 72.

The heat exchanger 38 is illustratively embodied to have a generally cylindrical shape. The body 68 of the heat exchanger 38 is illustratively formed of circular sheets 50 each including a central hole such that when stacked a penetration is formed through the body to receive the conduit section 45 of the stem 40. In the illustrative embodiment, the circular shape of the heat exchanger body 68 permits the cooling air and fuel manifolds 58, 62 to extend circumferentially around the conduit 45 for communication through the body 68. In some embodiments, the heat exchanger 38 may be formed to have any suitable shape and/or arrangement.

As shown in FIG. 4, the fuel injector 32 illustratively includes a check valve 88 for maintaining pressure within the fuel passageway 48. In the illustrative embodiment, the check valve 88 is arranged within the conduit section 45 in communication with the fuel. The check valve 88 is illustratively arranged near the outer casing 24, namely, near the pad 76. In the illustrative embodiment, the check valve 88 is arranged within the high pressure cavity 26, downstream from the body 70 of the heat exchanger 38 in the fuel flow direction. Arranging the check valve 88 away from the combustion chamber 30 can reduce the temperature to which the valve 88 and its components are exposed.

Returning briefly to FIG. 3, (cooled) cooling air (represented at arrows 44) is directed to an inner portion 90 of the gas turbine engine 10 as previously mentioned. The fuel injector 32 illustratively includes a conduit 92 arranged in communication with the cooling air conduit 64 to direct (cooled) cooling air through the inner portion 90 of the engine and into an inner wheel cavity 94 of the turbine 18. The cooling air can be vented from the inner wheel cavity 94 into the flow path of the combustion products for cooling, for example, at an inlet to the turbine 18 (outlet of combustor 96) and/or through turbine components (e.g., blades 22). In some embodiments, (cooled) cooling air may be directed outside of the outer casing 26 (instead of to the inner portion 90 or in addition to cooling air sent to the inner portion 90) for using in various areas of the engine 10. In some embodiments, the heat exchanger 38 may be arranged to discharge more than one distinct stream of cooling air where the streams have different temperatures, for example, for different uses. In some embodiments, the heat exchanger body 68 may be divided into more than one distinct cooling sections (for example, left and right sections as shown in FIG. 4, the right side including an optional stream of cooling air shown within conduit 98 distinct from that within conduit 64, and venting outside of the casing 24), each producing a distinct cooling air stream with appropriate temperature.

In the illustrative embodiment, each of the plurality of fuel injectors 32 includes one dedicated heat exchanger 38 formed integral therewith. In some embodiments, a single heat exchanger 38 may heat fuel provided to more than one nozzle 42. In the illustrative embodiment, the combustion liner 28 is annular to define an annular combustion chamber 30. In some embodiments, the combustion liner 28 includes a plurality of individual combustion liners or cans defining a plurality of circumferentially spaced combustion chambers with one or more fuel injectors 32 associated with each combustion chamber.

The present disclosure includes devices, systems, and methods for cooling of gas turbine cooling air as a means to enable improved engine efficiency by enabling a higher Overall Pressure Ratio (OPR). Providing Cooled Cooling Air (CCA) allows increased compressor exit and rotor inlet temperatures and/or reduced amounts of cooling air, which can result in improvement in engine efficiency. The heat sink considered for cooling the CCA may be either air or fuel. Regardless of heat sink, cooling the CCA by directing high pressure compressor bleed air outside of the engine case to a dedicated heat exchanger can require extensive air tubing which can add weight, complexity, and cost relative to an uncooled cooling air system. Devices, systems, and methods within the present disclosure can avoid those issues while providing the benefits of the heat exchange. The use of fuel as a heat sink for turbine cooling air is thermodynamically desired, but routing high temperature (above its auto-ignition temperature) fuel through long runs of tubing outside the engine case poses fire risks.

To reduce the fire risk, the present disclosure includes integrating Fuel Cooled Air Cooler (FCAC) modules with the fuel injectors. The FCAC can be located on the outside of the injector's case mounting pad with sufficient containment features to retain compressor discharge air and fuel within the injector assembly. For compactness and mechanical robustness, embodiments of the present disclosure may include that the heat exchanger core is formed of a laminated foil/printed circuit microchannel type design and construction.

The integrated FCAC module disclosed herein can reduce obstruction of the combustor gas path flow if located within the high pressure cavity upstream of the combustor inlet 36. The openings in the outer casing required to install the fuel injector may be reduced and/or made minimal. According to embodiments of the present disclosure, the amount of high temperature fuel and air flowing through tubes or ducts outside the outer casing can be reduced. The volume of high temperature fuel can be reduced because hot fuel is only present in the fuel injector assembly. This fuel may be immediately sent to the combustor for burning.

Overall weight of the CCA system can be reduced because various tubes, ducts, and associated mounting brackets can be reduced and/or eliminated for both air and fuel circuits. The air-to-fuel heat exchange function can be transferred from a single monolithic unit to smaller modules distributed among the fuel injectors and can reduce the consequences of a single point failure compared to fewer heat exchangers, including the risk/magnitude of inadvertent combustion.

In some embodiments, the FCAC can be easily removed and replaced as part of the fuel injector. The laminated microchannel heat exchanger core may provide more structural robustness and leak-resistance than other designs, for example, larger shell-tube type units, although other types of heat exchanger arrangements may be applied.

The present disclosure includes embodiments in which the FCAC is moved out of the combustor gas path, but communicates directly with the high pressure environment of the cavity 26. The pressure retaining and flow sealing features of the outer combustor casing 24 are maintained by using a high pressure cover, hood, or case that houses the FCAC core. This high pressure cover may be integrated with the fuel nozzle and may attach to the combustor casing. The high pressure cover may enable a smaller hole in the combustor case to allow for the insertion of the fuel nozzle stem and aero tip. The area around the stem may provide a flow path for (hot) compressor discharge air into the FCAC core.

Embodiments within the present disclosure include heat exchanger cores in the proposed location may be circular, square, generally conforming to the shape and size of the existing injector mounting/sealing flange. The volume required to size the heat exchanger core for its desired cooling duty may be taken as an increase in the core thickness in the engine's radial direction. In some embodiments, increasing the size (footprint along the outer casing) of the injector mounting/sealing flange is not precluded if radial packaging constraints dictate.

The present disclosure includes arranging the heat exchanger out of the primary gas flowpath of the engine 10. This can create room to insert a check valve downstream of the heat exchanger in a thermal environment that is relatively benign. The check valve located downstream of the heat exchanger core can maintain fuel pressure above its critical point and can avoid boiling in the heat exchanger. This reduces problems that may be encountered when locating such a pressure-maintaining device closer to the high temperature environment of the injector aero tip.

Because such a valve is desirable for a fuel cooled air cooler that heats fuel above its boiling range, regardless of heat exchanger location, a description of this valve's characteristics may include that the valve can be sized to provide needed fuel flow at conditions where the cooling air is being cooled (and fuel is heated), while inducing a pressure drop that keeps the fuel pressure above it's critical value (for example but without limitation, within the range of about 350 psia to about 500 psia), depending on fuel specification. This behavior may be accomplished with a set of springs acting on the pintle of the check valve, with the spring immersed in the flowing fuel for keep the spring relatively cool. Because spring rate typically decreases with increasing temperature, the spring set may be designed to produce the proper cracking pressure and flow restriction over the anticipated fuel temperature range. An over-balanced check valve could also be used to provide the same function that has a controlling orifice area.

Devices, systems, and methods within the present disclosure may include provision for the cooled cooling air flow to be transferred to either outside of the outer casing and/or to the inner core of the engine or both. The resulting cooling streams may be cooled to two different temperatures by dividing the heat exchanger core (body) into two separate sections. In some embodiments, a hot fluid flow other than compressor discharge may be used with or in place of cooling air to provide heat to the fuel within the injector integrated heat exchanger. The present disclosure includes provision for substituting a compact electrically heated core in place of the FCAC for the purpose of rejecting waste heat from the engine that has been converted to electric power. Rejecting this power to the fuel serves to return waste heat to the cycle, thereby improving engine performance. In some embodiments, heat to the fuel may be provided by a refrigerant rejecting heat from a power and/or cooling cycle.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An A gas turbine engine comprising:
a power train including a compressor, a combustor, and a turbine, the compressor arranged to compress air, the combustor including a combustion chamber arranged to receive compressed air and fuel for combustion to form exhaust products, and the turbine including a rotor and a blade extending from the rotor to receive exhaust products expanding across the blade to drive rotation of the rotor,
an outer casing defining a high pressure cavity adapted to receive compressed air from the compressor, the combustion chamber arranged at least partly within the high pressure cavity, and
a fuel injector including:
a nozzle configured to discharge fuel into the combustion chamber,
a stem secured to and penetrating through the outer casing, the stem fluidly coupled with the nozzle and configured to conduct fuel to the nozzle, and
a microchannel fuel-air heat exchanger formed integrally with the stem and including a body having a fuel passageway fluidly coupled with the nozzle, a fuel inlet, a fuel outlet, and a cooling air passageway arranged in thermal communication with the fuel passageway, in which the fuel enters the microchannel fuel-air heat exchanger through the fuel inlet in order for heat from the air in the cooling air passageway to be transmitted to the fuel within the fuel passageway,
wherein the microchannel fuel-air heat exchanger is arranged outside of the high pressure cavity and secured to the outer casing, and
wherein the fuel inlet and the fuel outlet are positioned on a wall of the stem.

2. The gas turbine engine of claim 1, wherein the outer casing includes a port defined therethrough and the stem is arranged to extend through the port.

3. The gas turbine engine of claim 2, wherein the outer casing includes a transfer passage arranged in fluid communication with each of the high pressure cavity and the cooling air passage to direct compressed air from the high pressure cavity into the cooling air passage.

4. The gas turbine engine of claim 3, wherein the transfer passage extends through the port.

5. The gas turbine engine of claim 1, wherein the microchannel fuel-air heat exchanger includes a hood defining an exchanger cavity, and wherein the hood is secured to the outer casing.

6. The gas turbine engine of claim 5, wherein the stem extends through the hood into the high pressure cavity.

7. The gas turbine engine of claim 5, wherein the body of the microchannel fuel-air heat exchanger is arranged within the exchanger cavity and the stem extends through the body.

8. The gas turbine engine of claim 1, wherein the fuel injector includes a check valve arranged within the stem to maintain pressure within the fuel passageway of the microchannel fuel-air heat exchanger.

9. The gas turbine engine of claim 8, wherein the check valve is arranged within the stem at the outer casing.

10. The gas turbine engine of claim 9, wherein the check valve is arranged within the stem at the outer casing within the high pressure cavity.

11. The gas turbine engine of claim 1, wherein the body of the microchannel fuel-air heat exchanger includes a plurality of stacked sheets bonded together, wherein the sheets are etched to form a first plurality of microchannels and a second plurality of microchannels therein, wherein the first plurality of microchannels define at least a portion of the fuel passageway, and wherein the second plurality of microchannels define at least a portion of the cooling air passageway.

12. A gas turbine engine comprising:
a power train including a compressor, a combustor, and a turbine, the compressor arranged to compress air, a combustion chamber of the combustor arranged to receive compressed air and fuel for combustion to form exhaust products, and the turbine including a rotor and a blade extending from the rotor to receive exhaust products expanding across the blade to drive rotation of the rotor,
an outer casing defining a high pressure cavity adapted to receive compressed air from the compressor, the combustion chamber arranged at least partly within the high pressure cavity, and
a fuel injector including:
a nozzle configured to discharge fuel into the combustion chamber,
a stem secured to the outer casing, a conduit section of the stem penetrating through the outer casing and fluidly coupled with the nozzle, the conduit section configured to conduct fuel to the nozzle, and
a microchannel fuel-air heat exchanger formed integrally with the stem, a body of the microchannel fuel-air heat exchanger having a fuel passageway fluidly coupled with the nozzle and a cooling air passageway arranged in thermal communication with the fuel passageway,
wherein the microchannel fuel-air heat exchanger is arranged outside of the high pressure cavity and secured to the outer casing, the conduit is arranged to allow fuel to pass out of the conduit section and into the fuel passageway of the microchannel fuel-air heat exchanger through an inlet, and the microchannel fuel-air heat exchanger is configured to transmit heat from air in the cooling air passageway to fuel within the fuel passageway for forming heated fuel and to pass the heated fuel into the conduit section through an outlet.

13. The gas turbine engine of claim 12, wherein the outer casing includes a transfer passage arranged in fluid communication with each of the high pressure cavity and the cooling air passage to direct compressed air from the high pressure cavity into the cooling air passage.

14. The gas turbine engine of claim 13, wherein the transfer passage extends through a port defined through the outer casing, and wherein the conduit section is arranged to extend through the port.

15. The gas turbine engine of claim 12, wherein the microchannel fuel-air heat exchanger includes a hood defining an exchanger cavity, and wherein the hood is secured to the outer casing.

16. The gas turbine engine of claim 15, wherein the stem extends through the hood into the high pressure cavity.

17. The gas turbine engine of claim 15, wherein the body of the microchannel fuel-air heat exchanger is arranged within the exchanger cavity and the stem extends through the body.

18. The gas turbine engine of claim 12, wherein the fuel injector includes a check valve arranged within the stem to maintain pressure with the fuel passageway of the microchannel fuel-air heat exchanger.

19. The gas turbine engine of claim 18, wherein the check valve is arranged within the stem at the outer casing.

20. The gas turbine engine of claim 19, wherein the check valve is arranged within the high pressure cavity.

21. The gas turbine engine of claim 12, wherein the body of the microchannel fuel-air heat exchanger includes a plurality of stacked sheets bonded together, wherein the sheets are etched to form a first plurality of microchannels and a second plurality of microchannels therein, wherein the first plurality of microchannels are in fluid communication with inlet and the outlet, and wherein the second plurality of microchannels define at least a portion of the cooling air passageway.

* * * * *